US006495224B1

(12) United States Patent
Dutton

(10) Patent No.: US 6,495,224 B1
(45) Date of Patent: Dec. 17, 2002

(54) FUNCTIONALLY ENHANCED PROTECTIVE SHRINK-WRAP COVERINGS AND METHODS FOR THEIR MANUFACTURE AND USE

(76) Inventor: Robert R. Dutton, 7 Shasta, Irvine, CA (US) 92612

( * ) Notice: Subject to any disclaimer, the term of this patent is extended or adjusted under 35 U.S.C. 154(b) by 0 days.

(21) Appl. No.: 09/659,275

(22) Filed: Sep. 12, 2000

Related U.S. Application Data

(60) Provisional application No. 60/153,732, filed on Sep. 13, 1999.

(51) Int. Cl.[7] .............................................. B65B 53/00
(52) U.S. Cl. ..................... 428/34.9; 428/35.1; 428/412; 428/423.1; 428/424.2; 428/424.8; 427/372.2; 427/385.5; 427/393.5; 427/524; 427/507; 427/531; 427/525; 427/123; 427/455
(58) Field of Search .............................. 428/412, 423.1, 428/424.2, 424.8, 34.9, 35.1; 427/372.2, 385.5, 393.5; 524/507, 591; 525/123, 455

(56) References Cited

U.S. PATENT DOCUMENTS 4,786,561 A    11/1988    Fong .......................... 428/502
5,767,188 A  *  6/1998    Kamikuri .................... 524/507

FOREIGN PATENT DOCUMENTS

| EP | 0 240 626 A1 | 10/1987 |
| JP | 60 125635 A  |  7/1985 |
| JP | 05 104686 A  |  4/1993 |

* cited by examiner

*Primary Examiner*—Leszek Kiliman

(57) ABSTRACT

Functionally enhanced shrink-wrap materials having protective coatings composed of mixtures of a water-compatibilized, modified polyolefin resins (Component A) and a mixture of a water-compatibilized acrylic resin (Component B) and a water-compatibilized polyurethane resin (Component C) wherein said mixture contains from approximately 100% to 50% by weight Component B and from approximately 50% to 0% by weight of Component C are provided. Moreover, methods and materials are disclosed for providing protective shrink-wrap covering with enhanced, long-term durability and improved resistance to chemical contamination, biological agents, radiation, pollutants, physical stress and structural deformation among other environmental factors are also disclosed.

19 Claims, No Drawings

FUNCTIONALLY ENHANCED PROTECTIVE SHRINK-WRAP COVERINGS AND METHODS FOR THEIR MANUFACTURE AND USE

RELATED APPLICATIONS

This application claims the benefit of U.S. Provisional Application No. 60/153,732, filed Sep. 13, 1999, hereby incorporated in its entirety by this reference.

FIELD OF THE INVENTION

The present invention relates to functionally enhanced shrink-wrap coverings and structures made therefrom with improved resistance to harsh conditions, such as environmental, chemical, physical, radioactive and thermal exposure. Specifically, the present invention relates to functionally enhanced shrink-wrap materials having protective coatings used to protect a wide range of consumer, industrial and military articles in addition to articles made entirely from shrink-wrap materials such as temporary buildings and structures.

BACKGROUND OF THE INVENTION

The constant exposure to naturally occurring and man-made sources of environmental stress ultimately leads to the decay and eventual decomposition of nearly any substance. The material's physical and chemical properties and the nature of the environmental stress will determine the length of the decay process. For example, silicate structures such as the Great Sphinx in the Valley of the Kings has withstood centuries of extreme environmental exposure. Yet, this seemingly impermeable structure of stone has decayed significantly from its original grandeur. Furthermore, the delicate materials used to fashion the Sphinx's ornate decorative facade have long since been destroyed by the sun, wind, rain and temperature extremes of the Upper Nile Valley.

Modern man-made devices and machines such as aircraft, boats, military and civilian vehicles, and consumer products including electronics (articles), just to name a few, are made from diverse materials having a wide range of durability. Moreover, the widely varying types of environmental exposure these devices must endure can adversely affect even the most robust materials. For example, delicate aircraft fuselages and other airframe structural components are often shipped from a manufacturing plant to an assembly facility thousands of miles away. In route to the assembly facility these delicate aircraft parts may be exposed to the freezing rains and snow of the North Western United States, the scorching heat and sandstorms of the Mojave Desert followed by the pelting briny spray, extreme heat and tortuous winds of the Pacific Ocean. In addition to surviving these dramatic environmental extremes, this valuable shipment of vulnerable aircraft parts must also withstand the abuse of countless freight handlers, deck hands and longshoreman. Therefore, it is essential that this precious cargo be protected from such sustained abuse in order to assure its safe arrival at the final destination.

One of the most successful techniques designed to protect precious cargo from the environmental damage and physical abuses associated with shipping and storage has been the development of shrink-wrapping. Shrink-wrapping, in general, is a process by which an article is first enclosed in a sealed plastic material that then heated causing the shrink-wrap, or shrink-film, to contract forming a tight fitting covering over the article. The shrink-wrap itself can be constructed of numerous materials and in a variety of ways. Shrink-wraps can be single or multi-layered and they may be reinforced with either metallic or non-metallic fabrics. However, regardless of the material used, it is the external surface of the shrink-wrap that must withstand the brunt of environmental exposure. Once this outer covering is damaged, the integrity of the article encapsulated therein is compromised.

One of the most daunting challenges facing the protective covering industry has been to produce a shrink-wrap material or system capable of withstanding long-term exposure to environmental and physical stress. When presently available shrink-wrap materials are properly applied, a protective covering sufficient to last approximately two years under most conditions can be achieved. However, if the shrink-wrap is exposed to environmental extremes such as wind, extreme heat and cold, moisture, or intense UV radiation, this two-year period may be significantly shortened. Moreover, other factors such as chemical contamination, biological agents, radiation, pollutants, physical stress and structural deformation can exacerbate environmental factors leading to an even more rapid decay process.

Consequently, once the shrink-wrap covering is damaged, the article must be either be removed from the original shrink-wrap and a new shrink-wrap covering applied, or another shrink-wrap covering must be applied over the damaged one. In either case, the application of a new shrink-wrap covering significantly increases the cost associated with long-term storage. Furthermore, if the original covering must be removed prior to applying a new one, there is an increased potential of damaging the protected item. Efforts have been made to increase the durability and life span of currently available shrink-wrap materials.

Moderate increases in the durability and life span of shrink-wrap materials can be achieved by modifying the base formula of the shrink-wrap material itself. For example, solar exposure induced brittleness of the shrink-wrap covering can be minimized by the addition of ultraviolet (UV) light absorbing compounds and UV light and heat reflecting pigments. Ethylene vinyl acetate can be added to increase the shrink-wrap's flexibility thus preventing cracking and tearing in low temperature environments. Dyes can be added to the base formula providing the shrink-wrap with additional resistance to UV exposure and radiation. However, these additives have not significantly increased the useful life of shrink-wrap materials beyond two years.

One modification to the base formula that has improved the durability of shrink-wrap material in some applications is the addition of carbon black. Carbon black is a highly toxic form of elemental carbon that is used to increase the hardness of rubber and other polymers. When added to the base formula of shrink-wrap materials the final product has an increased resistance to chemical attack and UV radiation. However, the addition of carbon black results in a shrink-wrap covering that absorbs and retains tremendous amounts of heat. If exposed to the sun for any significant period, the interior of the shrink-wrapped article can reach temperatures high enough to melt plastic and destroy delicate electrons including microprocessors. Consequently, carbon black has extremely limited usefulness in the formulation of shrink-wrap materials.

Another approach to increasing the durability of shrink-wraps involves various types of covering applied to the shrank surfaces. The most basic covering is a protective tarp draped over the article and secured against the shrink-wrap surface. However, this approach has met with limited success, and in some cases has proved detrimental accelerating the shrink-wrap's decay. Tarps which are merely placed over the shrank surface do not provide significant protection from humidity, airborne pollutants or chemical aerosols. Furthermore, the tarps will often continually shift during transport abrading the shrink-wrap's surface causing the shrink-wrap material to tear and pull away from the article it was designed to protect. Therefore, coverings such as tarps, which are not integrated into the shrink-wrap material itself, lack versatility and do not significantly extend the shrink-wrap's useful life.

Another approach to providing protective coverings to commercial shrink-film would be to apply conventional resin based paints. However, the application of these coatings is fraught with difficulties and would require extensive pretreatment of the shrink-wrap surface to ensure adherence of the topcoat. If the topcoat is applied to an untreated surface they may, peel and blister shortly after application affording little or no protection to the shrunken surface. Therefore, it would be necessary to pre-treat the surface of the plastic shrink-wrap to enhance its receptiveness to conventional coating compounds such as paint.

Generally, there are two categories of plastic surface pretreatment techniques: physical treatments and chemical methods. Physical treatments include corona discharge, flame treatments plasma discharge and UV radiation. Corona discharge requires massive energy expenditures to generate sufficient voltage to alter the plastic's surface texture. Flame treatments are inherently hazardous and can irreparably damage the shrink-wrap's surface unless used cautiously. Plasma discharge and UV radiation pretreatment are equally unpopular due to the expense and difficulty in application. Consequently, these physical methods of surface pretreatment are seldom used and are of limited commercial value.

Traditional chemical pretreatment protocols required the use of highly toxic and environmentally damaging reagents such as 1,1,1-trichloroethane (TCE) which was used to degrease and swell the plastic's surface prior to applying the coating. However, recently, the use of TCE has been subjected to severe limitations by the Environmental Protection Agency requiring shrink-wrap installers to switch to the use of water-soluble detergents. Unlike TCE, these water-soluble processes do not swell or etch the shrink-wrap's surface to the degree required to assure the complete adhesion of the polymer topcoat. Therefore coatings applied following pretreatment procedures using water-soluble detergents blister, crack, and peal away from the shrink-wrapped surface. Consequently, top coats applied to the shrink-wrap's plastic surface pretreated with water-soluble detergents fail to extend the useful life of the shrink-wrap cover.

Moreover, coating procedures that may rely on resin-coating compounds that are viscous and water insoluble would require substantial dilution with organic solvents prior to application. During the application and drying processes, large amounts of toxic organic solvent vapors will be released which could potentially contaminate the atmosphere or saturate the immediate application environment creating a significant risk of fire or explosion. Consequently, expensive and sophisticated air handling systems would be needed to reduce atmospheric contamination and prevent the potentially explosive auto-ignition of the volatile vapors.

Therefore, there remains a need for functionally enhanced shrink-wrap coverings, which resists deterioration caused by long term exposure to environmental, chemical, physical, radiation and thermal sources of stress.

SUMMARY OF THE INVENTION

It is an object of the present invention to provide functionally enhanced shrink-wrap coverings, which resists deterioration caused by long term exposure to environmental, chemical, physical, radiation and thermal sources of stress.

It is another object of the present invention to provide a stable, highly protective long-term shrink-wrap material suitable for protecting articles including, but not limited to, aircraft, boats, military and civil vehicles, consumer goods, foodstuffs and buildings.

It is another object of the present invention to provide a stable, highly protective long-term shrink-wrap material suitable for use as a protective structure or habitat.

It is yet another object of the present invention to provide a coating for shrink-wrap coverings that extends the useful protection period of existing shrink-wrap materials.

It is still another object of the present invention to provide a method of coating shrink-wrap coverings using a water-soluble, environmentally safe material that extends the useful protection period and storage life of existing shrink-wrap materials resulting in functionally enhanced shrink-wrap materials.

The present invention provides functionally enhanced, extended life, long-term shrink-wrap materials. The unexpectedly long-lived functionally enhanced shrink-wrap materials of the present invention are formed by applying recently developed water-based primer compositions made using water-compatibilized polyolefin resins modified with an $\alpha, \beta$ unsaturated carboxylic acid, a water compatibilized acrylic resin, and a water compatibilized polyurethane to the surface of conventional shrink-wrap materials. The protective coating is applied to the surface of the shrunken material significantly enhancing the useful life of the shrink-wrap affording prolonged protection to articles encased therein. Non-limiting examples of articles which can be encased within the shrink-wrap material of the present invention include aircraft, boats, military and civilian vehicles, construction equipment, consumer goods, electronics and foodstuffs.

The present invention accomplishes these and other objectives by applying protective coatings to shrink-wrap materials. The coating compounds used in association with the teachings of the present invention are generally less toxic, safer to handle, easier to apply and/or less damaging to the environment than other compounds. Furthermore, the methods of the present invention do not require the use of hazardous, complex or expensive methods nor do they employ potentially toxic compounds to pre-treat the surface of the shrink-wrap covering.

Moreover, the present invention provides functionally enhanced shrink-wrap coverings having protective coatings that are versatile, resilient, environmentally safe and durable. Furthermore, the methods and materials of the present invention can be used to significantly increase the useful life of most currently available shrink-wrap materials.

Further objects and advantages of the methods and compositions of the present invention which utilize functionally enhanced shrink-wrap coverings for providing articles encased therein with long-term protection from extreme environmental exposure, as well as a better understanding thereof, will be afforded to those skilled in the art from a consideration of the following detailed description of exemplary embodiments, taken in conjunction with the drawing.

DETAILED DESCRIPTION OF THE INVENTION

The present invention is useful for providing articles with a versatile, resilient long-term functionally enhanced shrink-wrap material covering that will protect the article encased therein from exposure to environmental, chemical, physical, radiation and thermal sources of stress. Moreover, the present invention can also be used to provide long-term and temporary structures that are useful for storage and habitation.

Shrink-wrap coverings currently used to protect items during shipping, handling and storage are known by those skilled in the art to have a maximum useful life of approximately two years when subjected to environmental, chemical, physical, radiation and thermal stress. Moreover, it is known by those skilled in the art that efforts to extend the two-year life span of existing shrink-wrap materials through the use of additives to the base formulas or coatings applied either to the pre-shrunk or post-shrunk shrinkable materials have been largely unsuccessful.

However, the present inventor has surprisingly determined that the combination of new water-based paint compositions consisting of water compatibilized modified polyolefin, acrylic and polyurethane resins can be used to provide shrink-wrap materials with protective coatings that significantly enhance water resistance, humidity penetration resistance, and petroleum based solvent resistance. Moreover, these functionally enhanced shrink-wrap materials of the present invention provide long-term protection to the products, materials, and devices (articles) encased therein from all forms of environmental exposure. Furthermore, the functionally enhanced shrink-wrap materials of the present invention can be manufactured using significantly less toxic compounds and methods that are more environmentally safe and less hazardous than those methods presently known.

In one embodiment of the present invention suitable protective coating compounds include, but are not limited to, those compounds described and disclosed in U.S. Pat. No. 5,767,188 (the "'188 patent") issued Jul. 16, 1998 to Kamikuri, et al., the entire contents of which are hereby incorporated by reference. The water-based paint compositions of the '188 patent are essentially composed of three components. Component A is a polyolefin resin that has been water compatibilized using and amine compound. The compatibilized polyolefin resin is modified with an $\alpha,\beta$-unsaturated carboxylic acid, has a saponification value of between approximately 10 to 60 mg KOH per gram of resin and from approximate 0 to 30% by weight chlorine. The modified polyolefin resins have a mean molecular weight between approximately 4,000 and 30,000. The polyolefin component may also include a surfactant such as, but not limited to non-ionic surfactants and/or anionic surfactants. The concentration of surfactant is generally kept at or below 2.5% in order to maximize the polyolefin resin's water resistance.

Component B is a water compatibilized acrylic resin having a glass-transition point between approximately −50° C. to +20° C. Glass transition points less than −50° C. reduce the coating's impact resistance whereas glass-transition points over +20° C. generally result in a tacky finish. Functional groups, including, but not limited to carboxyl groups, carbonyl groups, epoxy groups, and hydroxyl groups can easily be added to the acrylic component. These added functional groups, especially when used in conjunction with curing agents, significantly increase the coatings' resistance to petroleum-based solvents and alcohols.

The third and final component, Component C, is composed of polyurethane resins having a break elongation in the range of approximately 200% to 600% at 20° C. Resins having break elongation points less than 200% result in decreased impact resistance while those having break elongation points exceeding 600% are noticeably tacky. Examples of commercially available water compatibilized polyurethane resins that may be used in accordance with the teachings of the present invention include, but are not limited to, Takelac W610 (trade name, Takeda Chemical Industries; break elongation 320%), Takelac W710 (trade name, Takeda Chemical Industries; break elongation 510%), U-coat UX-4300 (trade name, Sanyo Chemical Industries; break elongation 400%), U-coat UX-4560 (trade name, Sanyo Chemical Industries, break elongation 270%) Spensol L-52 (trade names, Dainippon Ink & Chemicals; break elongation 480%) Neorec R960 (trade name, "Zenekarejinzu"; break elongation 200%), and Olester UD100N (trade name, Mitsui Toatsu Chemicals; break elongation 250%).

For many applications it is desirable to combine water-soluble curing agents (Component D) with water-based coatings of the present invention. Curing agents can significantly reduce surface tackiness while only partially reducing flexibility by cross-linking with the functional groups found on the modified resins of the present invention. The exact combination of desired properties can be carefully regulated by combining the appropriate curing compounds with the coating components of the present invention. Suitable curing agents will react with the functional groups in the water-compatibilized acrylic resin to form a cured coating film and include water-soluble or water-dispersible water-based curing agents such as oxazoline type curing agents, amine type curing agents, epoxy type curing agents and/or amino resins can be employed.

Examples of acrylic resin (Component B) optional functional groups and curing agents include, but are not limited to: (1) Carboxyl groups and an oxazoline type curing agent; (2) Carboxyl groups and an epoxy type curing agent; (3) Carbonyl groups and an amine type curing agent; (4) Epoxy groups and an amine type curing agent; (5) Hydroxyl groups and an amino resin. Furthermore, carboxyl groups present in modified polyolefin resins or carboxyl and hydroxyl groups found on the modified polyurethane resins also participate in cross-linking reactions. The optional functional groups of the polyurethane polymers of the present invention may be present in the range of approximately 500 to 2000 g/equivalent.

Suitable oxaline type curing agents include Epocross K-1000 series and Epocross K-2000 series (all trade names of Nippon Shokubai; acrylic resins in aqueous dispersion containing oxazoline groups); examples of water-compatibilized polyamine compounds include Aquatote 8535 (trade name, Rhone-Poulenc; modified polyamidoamine with an amino value of 102), Fujicure FX-S913 (trade name, Fuji Chemical Industries; modified aliphatic polyamine type curing agent with an amino value of 210), and Polimento KX-CK-200 (trade name, Nippon Shokubai; amino-modified acrylic resin with an amino value of 1900). Hydrazine type cross-linking agents include, hydrazides of dibasic acids such as succinic acid dihydrazide, adipic acid dihydrazide, sebacic acid dihydrazide and isophthalic acid dihydrazide, aliphatic dihydrazine compounds such as ethylene-1,2-dihydrazine, propylene-1,3-dihydrazine and butylene-1,4-dihydrazine, etc., and 1,3-bis (hydrazinocarboethyl)-5-isopropylhydrantoin.

Aqueous dispersions of carbonyl-group-containing acrylic resins compounded with hydrazine compounds are also available commercially, and can be employed to advantage. Examples of these include the Acronal series (Products of Mitsubishi Petrochemical and Takeda Badische Urethane Industries, Ltd.)

The aforementioned epoxy type curing agents are compounds containing at least two epoxy groups per molecule, and include Novolak type epoxy resins and hydrogenated forms thereof and bisphenol A type epoxy resins synthesized from polyvalent phenol compounds, glycidyl ether type epoxy-group-containing compounds synthesized from polyvalent alcohols, glycidyl ester type epoxy-group-containing compounds synthesized from polyvalent carboxylic acids, and epoxyethyl type or cyclic oxirane type multifunctional epoxy type compounds synthesized by oxidizing unsaturated double bonds with peroxide compounds.

Suitable amino resins include compounds in which methylol groups obtained by adding formaldehyde to melamine, guanine or urea are etherified by an alcohol or other methods known in the arts. Specific commercially available examples of the aforementioned amino resins include, but are not limited to, Cymel 300, Cymel 303 and Cymel 327 (all trade names of Mitsui Cyanamid), and "Nikarakku" Nicalac MW-30, Nicalac MW-22 and Nicalac MW-24 (all trade names of Sanwa Chemical KK)

For optimum performance, the curing agent concentration should be adjusted to contain approximately 0.2–3.0 mole/mole, and preferably 0.5–2.0 mole/mole, relative to the number of functional groups in Components (A)–(C) which can react with the curing agent. Additional examples and details can be found in the '188 patent.

In one embodiment of the present invention these protective coating compounds are used applied to the surface of previously shrank, shrink-wrap coverings to form the functionally enhanced shrink-wrap materials of the present invention. Traditional shrink-wrap material is applied to the exterior of a device, machine, instrument or other article and shank to fit tightly against the surface using methods known to those skilled in the art including, but not limited to, heat. If the shrank surface has been exposed to environmental contamination such as dirt, grease, smog or other forms of contamination it may require washing prior to applying the protective coatings of the present invention. If washing is required, a relatively mild process using an aqueous based detergent solution is preferred. The detergent used may be an ordinary neutral household detergent or an environmentally compatible substance, such as but not limited to Simple Green® (Seal Beach, Calif.). After the covering has been cleaned of dirt, debris and grease soluble in the detergent used, it is rinsed once with normal tap water followed by a de-ionized rinse. The surface is then thoroughly dried using heated forced air (approximately 60° C.) or allowed to dry through unassisted evaporation.

Typically, shrink-wrap materials (shrinkable materials) are made from polymers that may contain a variety of specialized ingredients which enhance the polymer's stability, contractility, tolerance for ultraviolet (UV) light exposure, resistance to biological attack and humidity, to name but a few. Examples of base polymers used to fabricate shrink-wrap materials include, but are not limited to, polypropylene, polyamide, polybutylene terephalate, polyvinyl chloride, acrylonitrile-butadiene-styrene, ethylene stryrene interpolymers, polystyrene, acetyl, elastomers, polyvinyldiene chloride, polyvinyl alcohol, polysulfone, polycarbonate, cellulose-based, acetates, thermoplastic elastomer, polyethylene terephthalate, styrenic, polyesters, polyurethane, acrylates, polyphenylene oxide, polyolefins and polypropylene.

The protective coating materials of the present invention are then applied to the surface using any technique that is best suited for the particular surface geometry. Examples of application techniques include, but are not limited to spraying, brushing, fogging, rolling, and dipping. In one embodiment of the present invention the protective coating is composed of a mixture containing from approximately 20% to 70% by weight Component A, and from approximately 30% to 75% of a mixture of Component B plus Component C wherein the mixture contains from approximately 100 to 50% by weight Component B and from approximately 50% to 0% by weight of Component C. Component B. In another embodiment of the present invention the protective coating Component B is substituted with functional groups reactive with a forth ingredient, Component D.

The functionally enhanced shrink-wraps covering of the present invention may be include one or more other ingredients either integrated into the shrink-film itself, or mixed with the protective coating materials, such as, but not limited to organic solvents, UV absorbing agents, photostablizers, infrared absorbing or reflecting agents, leveling agents, flow-regulating agents, anti-foaming agents, plasticizers, pigments, inks, dyes, conductive pigments, pigment dispersants, curing agents, drying agents, catalysts, fire retardant, and biocidal agents.

In another embodiment of the present invention the functionally enhanced shrink-wraps of the present invention may be provided with natural or synthetic absorbent, non-abrasive fabric liners such as, but not limited to cotton, silk, wool, animal fur, plant fibers, polyester fibers (Dacron®, E.I. Dupont de Nemours & Co.), nylon, and others. Additionally, the functionally enhanced shrink-wrap material of the present invention may also have impact resistant shock absorbing materials bonded to the shrinkable film article-contacting surface. Suitable shock absorbing materials include, but are not limited to expanded, cellular polystyrene (Styrofoam® the Dow Chemical Co.), air filled cushions, and other impact resistant materials.

In another embodiment of the present invention the coating compounds are applied to shrink-wrap covers prior to shrinking.

In yet another embodiment of the present invention the coating compounds are applied to shrink-wrap covers whereby the shrink-wrap covers are shrank simultaneously with the coating process.

In another embodiment of the present invention the coating compounds of the present invention are applied to shrink-wrap coverings such that a base coat or primer layer is formed. After a suitable period, at least one additional coating may be applied to this base coat, or primer layer. In this embodiment, the present invention serves as a base coat, or primer layer, intended to afford extended, long term protection to the shrink-wrap material and also as a receptive surface for the second coating compound.

In another embodiment of the present invention the protective coating materials of the present invention are applied to the shrinkable material at a thickness of between approximately 1 millimeter to 1000 millimeters, preferably between approximately 3 millimeters to 40 millimeters, more preferably between approximately 5 millimeters and 20 millimeters.

EXAMPLE 1

The Shrink Wrap Coating System Designed to Prolong the Life of a Heat-shrunk Shrink-film Storage Cover Acrylic Coating Technical Specifications The coating compounds of the present invention are designed for specific applications and specific shrink-films.

The water-based coating currently used in most applications is comprised of single-component, water-based, 100% acrylic latex coatings. The coating compounds of the present invention are intended for applications over heat-shrunk polyethylene shrink-films.

The coating compounds of the present invention involve heat shrinking the article to be stored with a commercial grade 7-mil shrink-film. After the seams are taped and the article's exposed surfaces protected from over spray, the shrink-film is spray coated with the coating compounds of the present invention to about 8–14 mil thickness. It is then allowed to dry, which can vary greatly in time due to temperature, humidity, and solar exposure factors.

The coating compounds of the present invention are light tan in color and are designed to provide adhesion to the heat-shrunk shrink-film. The color differentiation between the shrink-film and the coating compounds of the present invention provides a thickness indication.

Application of an additional layer of coating will further extend the storage cover life span. The coating is UV stable and displays excellent heat reflection properties. It also provides an excellent protective membrane for many years, remaining flexible even under adverse conditions.

| Typical Properties: At 22° C. | |
|---|---|
| Color | Light tan |
| Tensile Strength (ASTM D412) | 279 psi. (50 kg/cm$^2$) |
| Elongation (ASTM D412) | 502% |
| Solids by Weight | 54 ± 2% |
| Solids by Volume | 41 ± 2% |
| Density | 10.6 lb./Gal. (1.3 kg/l) |
| Theoretical Yield | 7.8 mils/gal per 100 ft. sq. (2.1 mm/l/30 m$^2$) |

(Theoretical yield does not take into account application losses or thickness variation.)

While the invention has now been described with reference to several embodiments, those skilled in the art will appreciate that various substitutions, omissions, modifications and changes which may be made without departing from the scope or spirit thereof. Accordingly, it is intended that the foregoing description be considered merely exemplary of the invention and not a limitation thereof.

I claim:

1. Functionally enhanced shrink-films comprising:
   a shrunken shrinkable material; and
   a protective coating comprises a mixture containing a water-compatibilized, modified polyolefin resin (Component A) and a mixture of a water-compatibilized acrylic resin (Component B) and a water-compatibilized polyurethane resin (Component C) wherein said mixture contains from approximately 100% to 50% by weight Component B and from approximately 50% to 0% by weight of Component C.

2. The functionally enhanced shrink-films of claim 1 wherein said Component A comprises a, modified polyolefin resin having an α, β unsaturated carboxylic acid group, a saponification number of between approximately 10–60 mgKOH/g, between approximately 0% to 30% by weight chlorination and a molecular weight between approximately 4,000 to approximately 30,000; said Component B comprises a water-compatibilized acrylic resin having a glass transition temperature of between approximately −50° C. to +20° C. and said Component C comprises a water-compatibilized polyurethane resin having a break elongation in the range of approximately between 200% and 600% at 20° C.

3. The functionally enhanced shrink-films of claim 1 wherein said Component A further comprises a non-ionic surfactant or an anionic surfactant.

4. The functionally enhanced shrink-films of claim 1 wherein said protective coating further comprises additives selected from the group consisting of UV absorbing agents, photostablizers, infrared absorbing or reflecting agents, leveling agents, flow-regulating agents, anti-foaming agents, plasticizers, pigments, inks, dyes, conductive pigments, pigment dispersants, curing agents, drying agents, catalysts, fire retardant, and biocidal agents.

5. The functionally enhanced shrink-films of claim 1 wherein said shrinkable material is selected from the group consisting of polypropylene, polyamide, polybutylene terephalate, polyvinyl chloride, acrylonitrile-butadiene-styrene, ethylene stryrene interpolymers, polystyrene, acetyl, elastomers, polyvinyldiene chloride, polyvinyl alcohol, polysulfone, polycarbonate, cellulose-based, acetates, thermoplastic elastomer, polyethylene terephthalate, styrenic, polyesters, polyurethane, acrylates, polyphenylene oxide, polyolefins and polypropylene.

6. The functionally enhanced shrink-films of claim 1 further comprising an absorbent, non-abrasive fabric liner selected from the group consisting of cotton, silk, wool, animal fur, plant fibers, polyester fibers (Dacron®, E.I. Dupont de Nemours & Co.) and nylon.

7. The functionally enhanced shrink-films of claim 1 further comprising an impact resistant shock absorbing material.

8. Functionally enhanced shrink-films comprising:
   a shrunken shrinkable material; and
   a protective coating over said shrunken shrinkable material;
   wherein said protective coating comprises a mixture containing water-compatibilized, modified polyolefin resin (Component A) and a mixture of a water-compatibilized acrylic resin (Component B) and a water-compatibilized polyurethane resin (Component C) wherein said mixture contains from approximately 100% to 50% by weight Component B and from approximately 50% to 0% by weight of Component C.

9. The functionally enhanced shrink-films of claim 8 wherein said Component A comprises a modified polyolefin resin having an α, β unsaturated carboxylic acid group, a saponification number of between approximately 10–60 mgKOH/g, between approximately 0% to 30% by weight chlorination and a molecular weight between approximately 4,000 to approximately 30,000; said Component B comprises a water-compatibilized acrylic resin having a glass transition temperature of between approximately −50° C. to +20° C. and said Component C comprises a water-compatibilized polyurethane resin having a break elongation in the range of approximately between 200% and 600% at 20° C.

10. The functionally enhanced shrink-films of claim 8 wherein said Component A is present in the amount between approximately 20% to 70% by weight; said mixture is present in the amount between approximately 30% to 75% by weight.

11. The functionally enhanced shrink-films of claim 8 wherein said Component A further comprises a non-ionic surfactant or an anionic surfactant.

12. The functionally enhanced shrink-films of claim 8 wherein said protective coating further comprises additives selected from the group consisting of UV absorbing agents, photostablizers, infrared absorbing or reflecting agents, leveling agents, flow-regulating agents, anti-foaming agents, plasticizers, pigments, inks, dyes, conductive pigments, pigment dispersants, curing agents, drying agents, catalysts, fire retardant, and biocidal agents.

13. The functionally enhanced shrink-films of claim 8 wherein said shrinkable material is selected from the group consisting of polypropylene, polyamide, polybutylene terephalate, polyvinyl chloride, acrylonitrile-butadiene-styrene, ethylene stryrene interpolymers, polystyrene, acetyl, elastomers, polyvinyldiene chloride, polyvinyl alcohol, polysulfone, polycarbonate, cellulose-based, acetates, thermoplastic elastomer, polyethylene terephthalate, styrenic, polyesters, polyurethane, acrylates, polyphenylene oxide, polyolefins and polypropylene.

14. The functionally enhanced shrink-films of claim 8 further comprising an absorbent, non-abrasive fabric liner selected from the group consisting of cotton, silk, wool, animal fur, polyester fibers (Dacron®, E.I. Dupont de Nemours & Co.), and nylon.

15. The functionally enhanced shrink-films of claim 8 further comprising an impact resistant shock absorbing material.

16. Functionally enhanced shrink-films comprising:
   a shrunken shrinkable material; and
   a protective coating over said shrunken shrinkable material;
wherein said protective coating comprises a mixture containing from approximately 20% to 70% by weight of a water-compatibilized, modified polyolefin resin (Component A) having an $\alpha$, $\beta$ unsaturated carboxylic acid group, a saponification number of between approximately 10–60 mgKOH/g, between approximately 0% to 30% by weight chlorination and a molecular weight between approximately 4,000 to approximately 30,000; and from approximately 30% to 75% of a mixture of a water-compatibilized acrylic resin (Component B) having a glass transition temperature of between approximately −50° C. to +20° C. and a water-compatibilized polyurethane resin (Component C) having a break elongation in the range of approximately between 200% and 600% at 20° C., wherein said mixture contains from approximately 100% to 50% by weight Component B and from approximately 50% to 0% by weight of Component C.

17. A method for providing extended, long term protection to an article comprising:
   a) providing a shrinkable material;
   b) applying a shrinkable material to the surfaces of said article; and
   c) applying a protective coating to said shrinkable material wherein said protective coating comprises a mixture containing water-compatibilized, modified polyolefin resin (Component A) and a mixture of a water-compatibilized acrylic resin (Component B) and a water-compatibilized polyurethane resin (Component C) wherein said mixture contains from approximately 100% to 50% by weight Component B and from approximately 50% to 0% by weight of Component C.

18. The method of claim 17 wherein said Component A comprises a modified polyolefin resin having an $\alpha$, $\beta$unsaturated carboxylic acid group, a saponification number of between approximately 10–60 mgKOH/g, between approximately 0% to 30% by weight chlorination and a molecular weight between approximately 4,000 to approximately 30,000; said Component B comprises a water-compatibilized acrylic resin having a glass transition temperature of between approximately −50° C. to +20° C. and said Component C comprises a water-compatibilized polyurethane resin having a break elongation in the range of approximately between 200% and 600% at 20° C.

19. The method of claim 17 wherein said article is selected from the group consisting of aircraft, boats, military vehicles, civil vehicles, consumer goods, foodstuffs, electronic devices and buildings.

\* \* \* \* \*